COMPUTER ERROR ANTICIPATOR

Filed Jan. 18, 1968

INVENTORS
RICHARD J. CARNEVALE
JOHN E. CURRAN
GEORGE J. DOHANICH, JR.
JOHN F. O'DONNELL
WILLIAM H. SPEER
GARY A. TRUDGEN
LEONARD J. WALLACE

BY Sughrue, Rothwell, Mion, Zinn & Macpeak
ATTORNEYS

United States Patent Office
3,548,178
Patented Dec. 15, 1970

3,548,178

COMPUTER ERROR ANTICIPATOR

Richard J. Carnevale, Endwell, John E. Curran and George J. Dohanich, Jr., Endicott, John F. O'Donnell and William H. Speer, Apalachin, Gary A. Trudgen, Binghamton, and Leonard J. Wallace, Endicott, N.Y., assignors to International Business Machines Corporation, Armonk, N.Y., a corporation of New York Filed Jan. 18, 1968, Ser. No. 698,906
Int. Cl. G06f *11/00;* G11c *29/00*
U.S. Cl. 235—153 7 Claims

ABSTRACT OF THE DISCLOSURE

In a computer in which the cyclic gating activity of the computer logic system is controlled by cyclically generated microprogram control signals and clock pulses, the level of ground shift between the storage array and sense amplifiers of the microprogram control store is an indicia of the array noise level and probability of error in the microprogram control signals. When the ground shift preceding a cycle of activity indicates probability of error, the main computer clock is blocked for the ensuing cycle of gating activity thereby preventing a change of contents in the logic elements of the computer. An auxiliary clock source is enabled to allow continued cyclic activity of the microprogram control store and the sensing apparatus and other parts of the computer for which non-interrupted cyclic activity is desired.

BACKGROUND

The invention is in the field of computer error prevention means. In present day computer systems the speed of operation is an important consideration in the attainment of goals requiring complex and/or multiple computations. Science and technology have greatly improved computer speed and consequently computer capabilities by providing new components which operate at extremely rapid rates with low level signal voltages and currents. Although there are obvious advantages in the use of low level signals, one disadvantage is in the fact that a given amount of noise becomes more detrimental the lower the signal levels used. In some present day computers a microprogram control store is used to provide microprogram words to control the computer operation on a cyclic basis, each microprogram word determining what the computer does during a given cycle. Read only microprogram control stores are disclosed in connection with computers described more fully in U.S. Pat. No. 3,315,235 issued to Carnevale et al. on Apr. 18, 1967, and U.S. application No. 357,372, titled "Data Processing System" by Amdahl et al., filed Apr. 6, 1964, now Pat. No. 3,400,371, and assigned to the assignee of the present invention. The read-only microprogram control store of use in the above mentioned computers may be capacitive arrays of the printed circuit type wherein the position of the printed capacitors represents the storage of a one or zero bit. In such arrays, the output signal levels are very small and require highly sensitive sense amplifiers. A computer, such as that described in the Amdahl et al. application cited above, operates on a cyclic basis and cycles the control store in advance of the computer cycle which is controlled by the microprogram word. The word ROS will be used hereafter as referring to a read only control store, but it will be apparent to one of ordinary skill in the art that the invention described herein is not limited to any particular type of control store.

Assume such a computer operates on a 750 nanosecond computer cycle, during which time data moves from registers to an operational unit, to operation unit output latches, and back to registers all under the command of the microprogram or ROS word currently in a read-only store data register, ROSDR. A new ROS word is placed in ROSDR at the beginning of each cycle and controls computer operation during the cycle. In order to have the ROS word for cycle N ready to enter ROSDR at the beginning of cycle N, the ROS must be cycled some time during the preceding computer cycle N−1. Thus during cycle N−1 the addressed drive line of ROS array is driven and the selected ROS word is sensed by the sense amplifiers connected to the sense lines, and sent to the sense latches where it awaits the beginning of cycle N. A computer clock pulse places the ROS word from the latches into the ROSDR at the proper time.

Due to the low level signals on the ROS array sense lines, static discharge outside the machine may create noise in the ROS array sufficient to cause the output ROS word to be erroneous thereby resulting in a computer error during the next machine cycle. It is also possible for error causing noise in the array to be caused by other than static discharge.

In the past, computer errors have been dealt with by detecting the occurrence of a malfunction and either bringing the machine to a hard stop or branching to some preassigned starting point in the program.

Since the cost of stopping the computer or restarting the program is very high in terms of total program time and efficiency, it would be preferable if there were some way in which some types of computer errors could be anticipated and the anticipation indication used to allow the computer to pause in its operation until the threat of error has passed.

It is known that static discharge of certain magnitude will cause error in the computer by altering the ROS output word. It has been proposed to detect this error by parity checking the ROS output word. However, parity checking does not satisfactorily detect even number bit errors. The problem presented was to find some way to reliably detect when an error due to static discharge would likely occur and to allow the computer to pause whenever there is such a detection.

SUMMARY

The inventors have discovered a useable, reliable correlation between probability of low level control signal error and definable voltage levels (in specific portions of the computer electrical system) induced by static discharge into the machine frame. For example, the noise in the array, caused by static discharge external to the machine, shows up in the ground line connection between the array block and the sense amplifier block. Tests have shown that the level of the ground shift (noise in the ground line) is substantially independent of the position on the housing of the microprogram control store on which static discharge occurs. For example, when an artificial static discharge device is at one voltage level, the noise in the ground line is the same no matter where the discharge is placed on the machine housing. By detecting when the noise in the ground line is above a preset level a signal can be generated which is used to interrupt the computer until the noise dissipates. The ground line noise is detected during the cycling of the control store.

DETAILED DESCRIPTION OF DRAWINGS

The preferred embodiment of the present invention will be described in connection with a known type of computer described in the above mentioned patent and application.

In the ROS housing of the computer there is the ROS array block 10, the ROS sense amplifier block 12, and the ROS latches 14. Since the specific manner of addressing the ROS array 10 and of using the ROS output to control the computer is known in the prior art, it will not be discussed herein.

Figure 1:
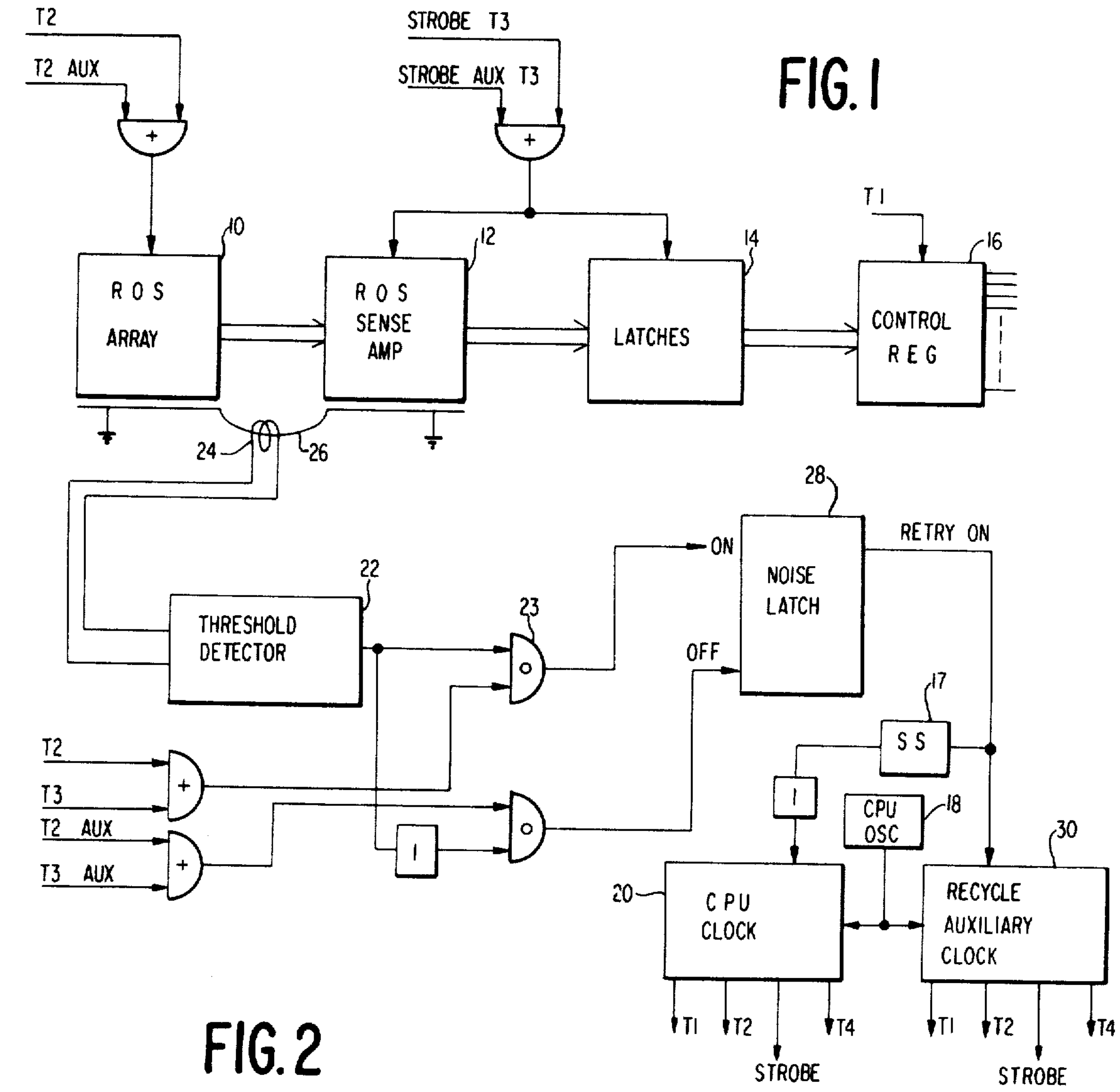
FIG. 1 is a block diagram of a preferred embodiment of the present invention.
Figure 2:
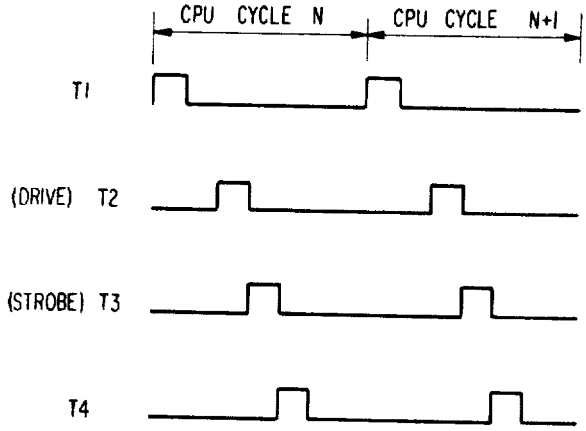
FIG. 2 is a waveform diagram helpful in understanding FIG. 1.

During normal operation, a drive pulse, indicated as pulse $T_2$ in FIGS. 1 and 2, drives the addressed ROS array drive line. The selected ROS word appears in parallel on the ROS array sense lines and is strobed through the sense amplifiers and into the sense latches by a strobe pulse indicated by $T_3$ in FIGS. 1 and 2. The ROS word in the latches 14 are gated into the ROSDR or control register 16 by the clock pulse $T_1$ thereby putting the selected ROS word into the register whose output lines control computer operation.

The clock pulses occurring during a 750 nanosecond cycle of the computer are illustrated by way of example in FIG. 2. The clock pulses are generated by a CPU oscillator 18 which feeds a CPU clock means 20. The CPU oscillator 18 provides the basic cycle timing of the computer, and the CPU clock means 20 provides the individual clock pulses which function to gate the data into and out of selected functional units of the computer and initiate the ROS cycle. The clock means 20 may include delay lines and logic circuits to provide output clocks at the proper times during each CPU cycle. The clock pulses illustrated herein are only generally representative of the clock pulses of the actual computer system but are sufficient to provide a complete understanding of the present invention.

During a single CPU cycle, data flows out of registers, through logical operations units such as adders, to adder output latches, and back to registers. Although the ROS word in control register 16 controls which of the registers, etc. enter into the operation during the cycle, the clock pulses from CPU clock 20 control the entry of data into the selected registers, latches, etc.

Also, during each cycle, e.g. cycle N, the ROS is cycled by means of $T_2$ drive pulse and $T_3$ strobe pulse to place the ROS word for cycle N+1 in latches 14. Thus, at the start of cycle N+1, ROS word N+1 is ready to be gated into control register 16.

The remainder of the system shown in FIG. 1 operates to sense the ground shift between the ROS array 10 and sense amplifiers 12 and stop the normal clock pulses when the ground shift is at a level which indicates probable next cycle error. The phrase probable next cycle error is appropriate because when the ground shift is above the preset level, the ROS output word is probably erroneous and it would thus command the computer to perform an incorrect operation.

The ROS array 10 and the ROS sense amplifier 12 are both referenced to ground as is common in electronic systems. Since each is a separate unit a common ground is provided by connecting the array ground plane to the sense amplifier block ground plane by means of a wire 26 referred to as the ground connection.

It has been discovered that the noise likely to cause error can be detected by monitoring the current in the ground line. This is referred to as the ground line noise or ground shift. The computer itself, and its associated peripheral units, due to normal running operations, cause noise in the array which can be inductively sensed in the ground line. This noise is the normal machine running noise.

In operation, an inductive coupling means 24 such as a core with a coil wound thereon senses the ground shift in ground line 26 and applies a voltage proportional to the ground shift to a threshold detector 22. Detector 22 may be any type of adjustable threshold detector which is sensitive to low level signals and operates at high speed. When a preset level is exceeded the threshold detector 22 provides an output which sets a Noise Latch 28. The output of the threshold detector 22 is then ANDed with a sense pulse in AND gate 23. Although in the drawing the sense pulse is illustrated as being the combination of $T_2$ and $T_3$, in a specific preferred embodiment the sense pulse is generated in response to the clock pulses (or in response to corresponding auxiliary clock pulses). It is preferable to have the sense pulse extend through as much of the present machine cycle as possible and still have enough time to stop the main clock before the following cycle of activity.

When the noise latch 28 is set, it gates off the CPU clock 20. After a predetermined delay, caused by single shot 17, to permit abatement of the noise disturbance and also to assure sense amplifier recovery, the auxiliary clock 30 is gated on. The auxiliary CPU clock 30 may be similar to CPU clock 20, the corresponding output pulses occurring at the same times with respect to the pulses from the cycle controlling CPU oscillator 18. The output pulse times of clock 30 are the same as those illustrated in FIG. 2 except they are referred to herein as $T_1$ aux, $T_2$ aux, etc.

When the CPU clock 20 is blocked, it stops producing the clock pulses necessary to gate data into the registers, operational units, and latches of the computer. Consequently the contents of the latter elements will remain unchanged during the time that CPU clock 20 is gated off resulting in a pause in the normal computer operation. The auxiliary clock pulses, which are generated during the computer pause, are applied to the ROS and detection circuitry to provide in the preferred embodiment continuous ROS cycling and noise detection. Since the clocks 20 and 30 provide a complete group of output clocks in response to the CPU oscillator pulses, a computer pause starts at the beginning of a cycle and terminates at the end of a cycle. Alternatively, the computer pause may be extended for one or more cycles or portions of cycles by delaying the starting of the auxiliary clock for a predetermined interval after blocking the CPU clock incident to detection of noise.

As illustrated in FIG. 1, $T_2$ aux is OR-ed with $T_2$ to drive the ROS array 710, and $T_3$ aux is OR-ed with $T_3$ to strobe the sense amplifiers 12 and latches 14. However, if during the drive or strobe time, threshold detector 22 provides a trigger output, the noise latch 28 will be set thereby blocking $T_1$ of the next cycle from gating the new ROS word into the control register 16.

Since the noise level in the array resulting from static discharge which causes error varies from system to system, there is no single threshold level which will satisfy all computers. In practice even the same computer may require different threshold levels depending upon such factors as ground integrity between frames, *I/O* population and configuration, power line input configuration. The actual value of the threshold level is not critical to the invention. It must be somewhere between a level which will set the noise latch in response to normal machine running noise and that which sets the noise latch in response to noise which definitely will cause an error.

With a threshold detector having a dial setting the running noise level and the definite error level can be determined. By running the machine and adjusting the threshold level down until the noise latch sets and remains set the threshold for running noise is known. The upper limit can be determined by disabling the noise latch, artificially generating static discharge and parity checking the ROS word output. Static discharge can be generated by cyclically charging and discharging a capacitor, the discharge being through a resistive probe touching the computer chassis. By increasing the charge voltage on the discharge device and detecting when the ROS word shows continuous parity error one obtains a measure of the amount of static discharge which causes ROS word errors. With the discharge device running at the latter error causing level, the noise latch can be enabled and the threshold lowered from the maximum setting of the threshold detector until the noise latch is set. Thus, the threshold level at which the noise latch sets represents the level which will be caused by error causing static discharge. In order to be safe, the threshold level should be lowered from the latter level. The lowering of the threshold level results in the computer pausing occasionally when there is no real error, but it insures that the computer will always pause when an error due to static discharge does occur. Consequently, it is a matter of choice as to where the threshold level should be set between the level responsive to running noise and the latter mentioned level. It will be apparent that the higher the level the greater the probability that the noise latch sets only when the ROS word is in error, but on the other hand the possibility of the noise latch failing to set when an ROS word is erroneous also increases. Other approaches to detecting a probable next cycle error signal and allowing a computer to pause, are described and claimed in the following commonly assigned patent applications:

"Probable Future Error Detector," William F. Shutler, Ser. No. 698,896, filed on the same date as the present application; and "Computer Error Anticipator and Cycle Extender," Harry G. Healy et al., Ser. No. 698,905, filed on the same date as the present application.

While the invention has been particularly shown and described with reference to preferred embodiments thereof, it will be understood by those skilled in the art that various changes in form and details may be made therein without departing from the spirit and scope of the invention.

What is claimed is:

1. In a computer having a source of cyclically varying control signals for controlling cycles of gating activity of the computer logic system:

means for sensing noise likely to affect said control signals, at a time just prior to each activity cycle when the control signals instantly being produced by said source to control the ensuing activity cycle are most likely, in the presence of an excessive level of noise, to cause computing error in the ensuing cycle; and means responsive to sensing of an excessive level of noise by said sensing means to control said source and said computer logic system to pause in their respective operations for at least one cycle of operation while preserving their respective signalling conditions and to reproduce the conditions instantly preceding said pause at the conclusion of said pause.

2. In a computer as claimed in claim 1 wherein said sensing means comprises a main source of clock signals and a control store of program signals, and wherein said means responsive to sensing comprises:

means for blocking clock signals to prevent elements of said computer logic system normally gated by said selected clock signals from changing their contents, and auxiliary clock means for producing auxiliary clock signals to control the cyclic operation of said control store and said means for sensing during said pause.

3. In a computer as claimed in claim 2 wherein said control store includes a storage array, sense amplifiers, and sense latches and a ground line connection between said storage array and said sense amplifiers, said sensing means comprising, (a) means for sensing the ground shift on said ground line connection, (b) threshold means for providing an output trigger signal when said ground shift is above a preset level, said threshold means being preset to provide a trigger when said ground shift level indicates noise in said array is at a selected level between normal running noise and noise which definitely would cause error in said program signals.

4. In a computer as claimed in claim 3, wherein said means for blocking comprises, (a) noise latch means for providing a first output signal level when in the one condition and a second output signal when in an opposite condition, (b) logic means for setting said noise latch means in response to the coincidence of said trigger signal and a first cyclically occurring timing signal generated from said main source clock pulses and covering a time in which noise would affect the program signals being read out from said control store.

(c) logic means for resetting said noise latch means in response to the coincidence of the absence of said trigger signal and a second timing signal generated from said auxiliary source clock pulses and covering a time in which noise would affect the program signals being read out from said control store, (d) means responsive to the initiation of said first output for disabling said main clock source and enabling said auxiliary clock source, and (e) means responsive to the initiation of said second output for disabling said auxiliary clock source and enabling said main clock source.

5. In a computer as claimed in claim 4, said control store being a read-only capacitive microprogram control store and said means for sensing comprises an inductive sensing means inductively connected to said ground line connection.

6. In a system of the type having a memory array in which the output word appearing on the sense lines of said memory array is applied to a bank of sense amplifiers, said array and said sense amplifier bank being referenced to the same electrical ground via a ground line connection, apparatus for detecting the static discharge induced noise level in said memory comprising, (a) means for sensing the level of ground shift in said ground connection, and (b) means responsive to said sensing means for providing an indication of probable error in the output word of said memory.

7. In a system as claimed in claim 6, said means for providing an indication of probable error comprising a threshold means for providing an electronic output indicating probable error when the ground shift sensed by said sensing means is the result of static discharge sufficient to cause probable error causing noise in said memory.

References Cited

UNITED STATES PATENTS

| | | | |
|---|---|---|---|
| 2,756,409 | 7/1956 | Lubkin | 340—146.1X |
| 3,391,344 | 7/1968 | Goldberg | 325—42X |

OTHER REFERENCES

Ashley and Cohler, Solving Noise Problems in Digital Computer Memories, Electronics, Mar. 25, 1960, pp. 72, 73, 74.

Womack, Schmoo Plot Analysis of Coincident-Current Memory Systems, IEEE Transactions on Electronic Computers, Februray 1965, pp. 36–44.

EUGENE G. BOTZ, Primary Examiner

C. E. ATKINSON, Assistant Examiner

U.S. Cl. X.R.

340—172.5, 174